United States Patent
Hente et al.

(10) Patent No.: US 9,161,416 B2
(45) Date of Patent: Oct. 13, 2015

(54) METHOD FOR ADJUSTING A COLOR POINT OF LIGHT EMITTED FROM AN ORGANIC LIGHT EMITTING DIODE OLED

(71) Applicant: KONINKLIJKE PHILIPS N.V., Eindhoven (NL)

(72) Inventors: Dirk Hente, Wuerselen (DE); Joseph Hendrik Anna Maria Jacobs, Eygelshoven (NL); Céline Catherine Sarah Nicole, Eindhoven (NL); Christian Kalkschmidt, Aachen (DE)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/360,314

(22) PCT Filed: Nov. 22, 2012

(86) PCT No.: PCT/IB2012/056631
§ 371 (c)(1),
(2) Date: May 23, 2014

(87) PCT Pub. No.: WO2013/080099
PCT Pub. Date: Jun. 6, 2013

(65) Prior Publication Data
US 2014/0354183 A1   Dec. 4, 2014

Related U.S. Application Data

(60) Provisional application No. 61/564,451, filed on Nov. 29, 2011.

(51) Int. Cl.
*H05B 37/02* (2006.01)
*H05B 33/08* (2006.01)

(52) U.S. Cl.
CPC .......... *H05B 33/0896* (2013.01); *H05B 33/086* (2013.01); *H05B 37/0254* (2013.01); *Y02B 20/36* (2013.01)

(58) Field of Classification Search
USPC ............ 315/287, 297, 307, 308, 360; 345/76, 345/82, 690, 695
See application file for complete search history.

(56) References Cited

U.S. PATENT DOCUMENTS 7,301,543 B2 * 11/2007 Higgins ......................... 345/589
7,876,341 B2 * 1/2011 Credelle et al. ................ 345/695
(Continued)

FOREIGN PATENT DOCUMENTS

| | | |
|---|---|---|
| WO | 2008040318 A1 | 4/2008 |
| WO | 2011145448 A1 | 11/2011 |
| WO | 2012105998 A1 | 8/2012 |

*Primary Examiner* — Tung X Le
(74) *Attorney, Agent, or Firm* — Yuliya Mathis

(57) ABSTRACT

The present invention relates to a method for adjusting a color point (507, 509, 511) of light emitted (111) from an organic light emitting diode OLED (107) by using current (115) with a modulated waveform for driving the OLED (107), wherein the waveform is characterized by at least three different parameters, and wherein the color point (507, 509, 511) is located in a color space, the method comprising: —defining a color point target (501); —adjusting simultaneously the at least three parameters to tune the waveform such that the resulting light output of the OLED (107) is lying within a predefined area around the color point target and for which the brightness of the OLED (107) remains at a predefined level; and —employing the tuned waveform to provide the current (115) with the modulated waveform to the OLED (107).

9 Claims, 3 Drawing Sheets

(56) References Cited

U.S. PATENT DOCUMENTS

| | | |
|---|---|---|
| 2007/0052637 A1 | 3/2007 | Giraldo et al. |
| 2007/0285378 A1 | 12/2007 | Lankhorst et al. |
| 2009/0079358 A1 | 3/2009 | Shteynberg et al. |
| 2009/0243499 A1 | 10/2009 | Hsu et al. |
| 2010/0060185 A1* | 3/2010 | Van Duijneveldt ......... 315/287 |
| 2010/0171438 A1* | 7/2010 | Whitt et al. ................. 315/291 |
| 2010/0245227 A1 | 9/2010 | Chen et al. |

* cited by examiner

METHOD FOR ADJUSTING A COLOR POINT OF LIGHT EMITTED FROM AN ORGANIC LIGHT EMITTING DIODE OLED

CROSS-REFERENCE TO PRIOR APPLICATIONS

This application is the U.S. National Phase application under 35 U.S.C. §371 of International Application No. PCT/IB2012/056631, filed on Nov. 22, 2012, which claims the benefit of [e.g., U.S. Provisional Patent Application No. or European Patent Application No.] 61/564,451, filed on Nov. 29, 2011. These applications are hereby incorporated by reference herein.

FIELD OF THE INVENTION

The invention relates to the field of solid state lightening and more particularly to a method of color control for OLED lighting.

BACKGROUND

Solid state lightening devices, such as the well-known organic light emitting diode OLED, are widely used for a number of lighting applications. The OLED, when operated, provides light, having color point chromaticity coordinates within the standard CIE diagram.

The color point of an OLED device is affected by many factors related, for example, to the production process. This leads to a shift of the color point chromaticity coordinates with respect to an expected color point location in the CIE diagram. For example, different OLEDs being driven at the same current lead to different output lights having different color points.

Due to the sensitivity of the human eye to variations in chromaticity, it is desirable to minimize the color point variation. To prevent such color shifts, a pulse width modulation (PWM) method can be used to control the OLED lighting. Prior art (US 2007/0285378) proposes the mode on/off for controlling the driving current of the OLED. In this mode, the OLED is either full on or full off.

SUMMARY OF THE INVENTION

It is an objective of embodiments of the invention to provide for an improved computer-implemented method, data processing system and corresponding computer-readable storage medium. Said objective is solved by the subject matter of the independent claims. Advantageous embodiments are described in the dependent claims.

The term "CIE" as used herein refers to a chromaticity diagram based on a CIE color system using color matching functions, which was adopted in 1931 by CIE (Commission Internationale d'Eclairage).

The term "OLED" as used herein refers to devices including organic light emitting materials generally, and includes but is not limited to organic light emitting diodes.

The term "chromaticity" as used herein defines the perceived colour impression of light according to standards of the Commission Internationale de l'Eclairage.

The term "Duty cycle" as used herein refers to the portion of a signal cycle during which the signal is at higher level compared to the duration of the entire signal cycle. For example, if we consider a signal waveform with a low value Imin, a high value Imax and a duty cycle D, the average value of the waveform over a period of time T is given by: $D \cdot Imax + (1-D) \cdot Imin$.

The term "color point" as used herein refers to a certain coordinate in a chromaticity diagram, for example a (x,y)-coordinate in the 1931 CIE standard diagram.

The term "luminance" as used herein refers to the amount of visible light that comes to a person's eye from a surface. The light leaving the surface can be due to reflection, transmission, and/or emission. Brightness is the perceptual correlate of luminance.

The term "color temperature" as used herein defines the temperature of a physical light source whose perceived color most closely resembles that of an ideal light source at the same brightness and under specified viewing conditions.

The term "color distance" as used herein refers to the distance separating two color points in the CIE diagram coordinates.

The term "Computer memory" or "memory" is an example of a computer-readable storage medium. Computer memory is any memory which is accessible by a processor. Examples of computer memory include, but are not limited to: RAM memory, registers, and register files. In some instances a computer memory may also include: a hard disk drive, a floppy drive or a solid state hard drive. For instance, part of a memory may in fact be swap space on a hard drive. Further memory examples are: arrays of mechanical switches, resistors and other electrical components. References to "computer memory" or "memory" should be interpreted as possibly comprise multiple memories. The memory may for instance comprise multiple memories within the same computer system. The memory may also comprise multiple memories distributed amongst multiple computer systems or computing devices.

The term "processor" as used herein encompasses an electronic component which is able to execute a program or machine executable instruction. References to the computing device comprising "a processor" should be interpreted as possibly containing more than one processor or processing core. The processor may for instance be a multi-core processor. A processor may also refer to a collection of processors within a single computer system or distributed amongst multiple computer systems.

In one aspect, the invention relates to a method for adjusting a color point of light emitted from an organic light emitting diode OLED by using current with a modulated waveform for driving the OLED, wherein the waveform is characterized by at least three different parameters, and wherein the color point is located in a color space, the method comprising:
  defining a color point target;
  adjusting simultaneously the at least three parameters to tune the waveform such that the resulting light output of the OLED is lying within a predefined area around the color point target and for which the brightness of the OLED remains at a predefined level; and
  employing the tuned waveform to provide the current with the modulated waveform to the OLED.

Said embodiment may be advantageous, because an OLED can be driven in a predefined manner for emitting light in the target color point region. In addition, the method works with any waveform shape. The waveform is characterized by at least three different parameters, which means that the OLED may operate in a plurality of modes comprising on mode, on/off mode etc. This is in contrast to a singular on/off nature of the OLED using pulse waveforms having time intervals where the OLED does not emit light. This has the advantage that the resulting color point chromaticity coordinates lie within a large area in the CIE diagram, which allows for an optimal color point shift correction and a flexible fine-tuning of the color point location.

According to another embodiment the adjustment of the at least three parameters comprises:

determining a set of groups of parameters, wherein each group of parameters of the set of groups of parameters is defining a specific shape of the modulated waveform; and selecting the group of parameters of the set of groups of parameters for which the resulting light output of the OLED is lying within a predefined area around the color point target and the brightness of the OLED remains at a predefined level.

According to another embodiment the method further comprises the steps of:

for each group of the parameters defining the respective modulated waveform and calculating an averaged color point, wherein the calculation of the averaged color point comprises a summation over at least one period of the waveform of every color point associated to the current amplitude at each point in time of the modulated waveform, weighting the summation by a luminance associated to the current amplitude at each point in time of the modulated waveform, wherein the summation is performed assuming that the luminance is linearly correlated to the current;

for each averaged color point calculating a color distance to the target color point;

selecting the modulated waveforms for which the color distances are lying within a predefined distance from the target color point; and choosing one of the selected modulated waveforms for performing the step of employing of the respective group of parameters for that waveform to provide the current with the modulated waveform to the OLED.

Said embodiment may be advantageous due to the precise estimation of the color point coordinates of the OLED based on the average calculation method using prior input information from the OLED. This leads to a better correction for the color point shift. Also, the assumption that the luminance is linear with the current simplifies the calculation while it is still a good assumption as approved by the experimental measurements. The distance between the color point target and the averaged color point may be calculated with the mathematical Euclidian method, which gives the best estimation of the distance between two color points coordinates in the CIE diagram.

According to another embodiment the step of choosing one of the selected modulated waveforms comprises: choosing the modulated waveform of the selected modulated waveforms with the lowest current amplitude and/or the lowest root mean square amplitude.

This embodiment may be advantageous, because the minimum current amplitude is preferable for minimum inhomogeneity in an illuminated area where many OLED devices are located next to each other. The minimum root mean square current amplitude has the advantage of reducing thermal load due to heat emitted by the OLED.

According to another embodiment the modulated waveform comprises a pulse width modulated waveform or a pulse frequency modulated waveform.

Said embodiments may be advantageous since tuning different types of groups of parameters directly influences the color point of the light emitted by the OLED in a flexible manner. Different types of parameters for the same OLED result in different extended areas in the CIE diagram. Therefore, it is more possible that the OLED output lights fall within the well defined target color point region.

According to another embodiment the area around the color point target is:

a rectangle, wherein a maximum diagonal length of the rectangle is smaller 0.1, more preferably smaller 0.05 and most preferably smaller 0.00768 in the standard CIE diagram, or a circle, wherein a maximum radius length of the circle is smaller 0.1, more preferably smaller 0.05 and most preferably smaller 0.00384 in the standard CIE diagram This is advantageous in that the minimum area size corresponds to the smallest discernible color difference the human eye can perceive. Also, this may fasten the color point adjustment process since it requires less iterations (i.e. smaller set of adjusted waveforms from which the driving waveform is selected) for achieving the desired light output within said target area.

According to another embodiment the modulated waveform comprises a periodic rectangular waveform characterized by two amplitude parameters and a duty cycle.

In a further aspect, the invention relates to a computer-readable non-transitory storage medium comprising computer-readable instructions which, when executed by a processor, cause the processor to perform the method of the present invention.

In another aspect, the invention relates to an OLED driver system for adjusting a color point of light emitted from an organic light emitting diode OLED by using current with a modulated waveform for driving the OLED, wherein the waveform is characterized by at least three different parameters, and wherein the color point is located in a color space, the OLED driver system comprising:

an adjusting unit for defining a color point target, wherein the adjusting unit is further adapted for adjusting simultaneously the at least three parameters to tune the waveform such that the resulting light output of the OLED is lying within a predefined area around the color point target and for which the brightness of the OLED remains at a predefined level; and a driver unit for employing the tuned waveform to provide the current with the modulated waveform to the OLED.

According to another embodiment, the driver unit comprises an integrated controller and/or a microcontroller circuit.

According to another embodiment, the adjusting unit comprises an info unit, a memory unit and a control unit. The info unit is used for determining waveform parameters characterizing a modulated waveform of a current for driving the OLED. Waveform parameters values are stored in the memory unit. The control unit monitors the OLED current to assure that current waveform has desired waveform parameters.

According to another embodiment, the info unit may be part of or separate from the driver system. In the latter case, the memory unit may be preprogrammed with the waveform parameters values.

According to another embodiment, the driver unit comprises the control unit and the memory unit. The info unit could be separate from the driver unit.

According to another embodiment, the driver system comprises the adjusting unit.

As will be appreciated by one skilled in the art, aspects of the present invention may be embodied as a system, method or computer program product. Accordingly, if not explicitly stated otherwise, aspects of the present invention may take the form of an entirely hardware embodiment, an entirely software embodiment (including firmware, resident software, micro-code, etc.) or an embodiment combining software and hardware aspects that may all generally be referred to herein as a 'module' or 'system'. Any combination of one or more computer-readable medium(s) may be utilized.

BRIEF DESCRIPTION OF THE DRAWINGS

In the following, preferred embodiments of the invention will be described in greater detail by way of example only making reference to the drawings in which.

DETAILED DESCRIPTION

In the following, like numbered elements in the figures either designate similar elements or designate elements that perform an equivalent function. Elements which have been discussed previously will not necessarily be discussed in later figures if the function is equivalent.

Figure 1:
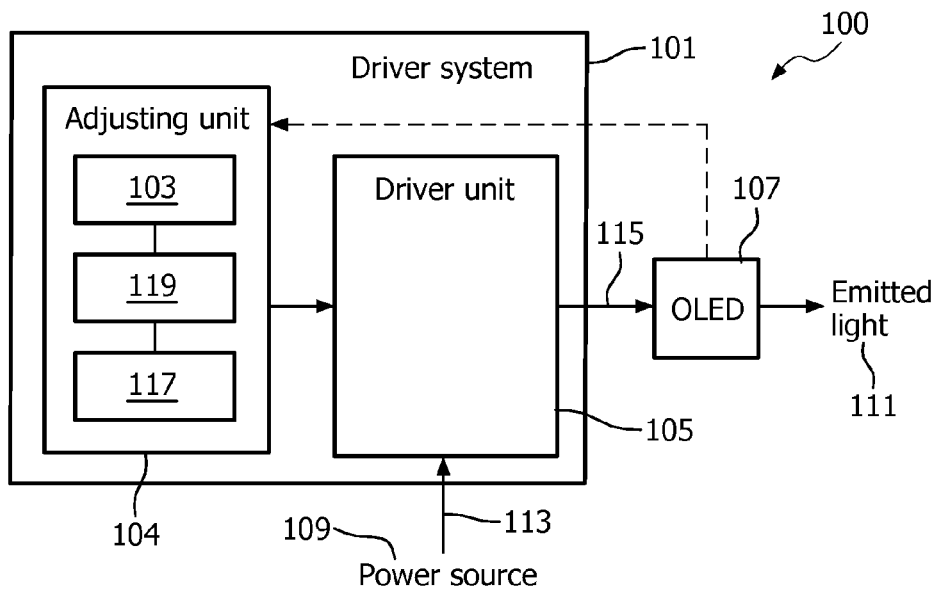
FIG. 1 illustrates a block diagram of an OLED driver system architecture.

FIG. 1 illustrates a system 100 arranged for operating an OLED 107. The system 100 comprises a driver system 101 for controlling the color point of the OLED 107. The driver system 101 comprises an adjusting unit 104 and a driver unit 105.

The driver unit 105 can be arranged to control the OLED emitted light 111. The driver unit 105 is responsive to a power signal 113 from a power source 109 for controlling the current levels 115 driving the OLED 107 in order to achieve a desired light output. The driver unit 105 may be, for example, a classical switched mode powers supply (SMPS). The driver unit 105 may be implemented using a controller integrated circuit and/or a microcontroller. The microcontroller may be, for example, a PICAXE from Microchip Technology Inc.

The adjusting unit 104 comprises an info unit 103, a control unit 117 and a memory unit 119. The info unit 103 comprises information relating to the operational characteristics of the OLED 107. These characteristics are measured for each OLED type. They describe, for example, the luminance and color point values as a function of waveform parameters. The info unit 117 is used by the adjusting unit 104 for determining waveform parameters characterizing a modulated waveform of a current for driving the OLED 107. Based on desired target luminance and color point values, waveform parameters values are determined during control and stored in the memory unit 119. The memory unit 119 may be, for example, embedded in a microcontroller such as a Cypress Semiconductor programmable embedded system-on-chip (PSoC) which is used to implement the functions of the adjusting unit. The control unit 117 monitors the OLED current to assure that current waveform has desired waveform parameters.

The info unit 103 may be provided internally or externally to the driver system. In the latter case, the memory unit 119 may be preprogrammed with the waveform parameters values. Example for a simple external programmable memory unit 119 is an array of resistors and/or potentiometers.

The OLED 107 is responsive to the drive current and emitting light 111. The operation of the system will be described in more detail with reference to FIG. 2.

Figure 2:
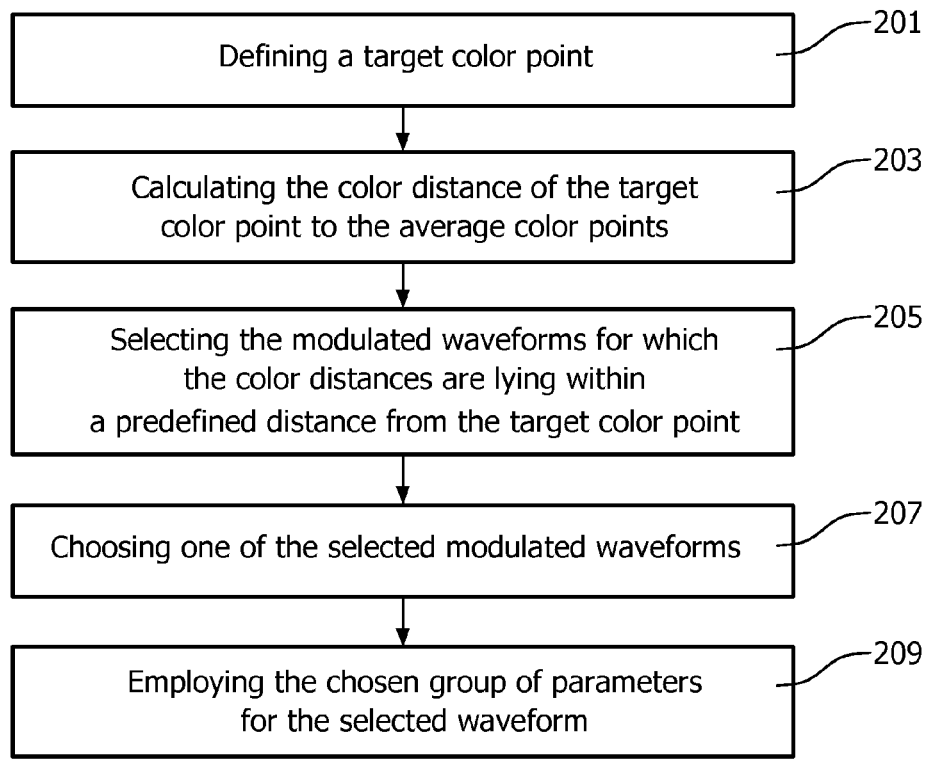
FIG. 2 shows a flow chart.

FIG. 2 is a flowchart of a method for adjusting a color point of light emitted from an organic light emitting diode OLED by using current with a modulated waveform for driving the OLED 107. The waveform is characterized by at least three different parameters. Examples of the waveform include without limitation a periodic waveform (FIG. 3), rectangular waveform, triangular waveform, etc.

In a first step 201, a desired light output of the OLED 107 is predefined. The desired light output is given as a color point target having the x and y coordinates ($X_{tar}$, $Y_{tar}$) in the standard CIE chromaticity diagram. The color point target is surrounded by a predefined target area.

The information about the desired light output is given to the adjusting unit 104, for example, by a user or it is preprogrammed information in the info unit 103. On basis of the target color point information and starting from a modulated waveform characterized by at least three different parameters, the info unit 103 determines a nominal driving signal to drive the OLED 107 to generate light having the target color point and the brightness of the OLED remains at a predefined level. The parameters of such modulated waveform include without limitation frequency, amplitude, duty cycle, width.

The target color point should be compared with a set of averaged color points ($X_{av}$, $Y_{av}$) in order to adjust the driving currents to the OLED. Each averaged color point is prior input to the system, which depends on a group of parameters of the modulated waveform causing the OLED to emit light having that averaged color point.

In step 203, the info unit 103 calculates for each averaged color point the color distance which is a mathematical distance to the target color point on the CIE diagram. The distance is defined as:

$$\text{dist} = \sqrt{(X_{av} - X_{tar})^2 + (Y_{av} - Y_{tar})^2}$$

Figure 3:
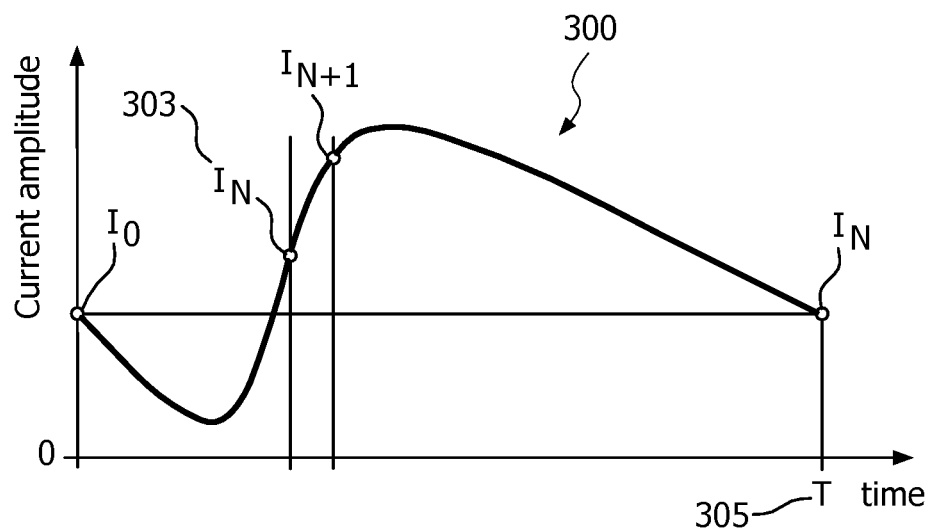
FIG. 3 shows a periodic waveform.

The averaged color point having the chromaticity coordinates ($X_{av}$, $Y_{av}$) within the standard CIE diagram is predetermined for each modulated waveform defined by a respective group of parameters. It is specific to each OLED type. The OLED type is characterized, for example, by the size of the OLED. The waveform 300 of FIG. 3 is first sampled to N samples over its time period. Each sample is associated with current amplitude $i_n$ 303. The current amplitude $i_n$ 303 causes the OLED to emit light having color point coordinates ($X_n$, $Y_n$) in the CIE diagram. The calculation of $X_{av}$ ($Y_{av}$) is performed by summing all the color point coordinates $X_n$ ($Y_n$) in the CIE diagram associated respectively to the current amplitudes in 303 at each point in time of the waveform 300. The summation is weighted by a luminance associated to the current amplitude $i_n$ at each point in time of the waveform 300.

The sums are described in these formulas:

$$X_{av} = \frac{\frac{1}{N}\sum_{n=0}^{N} X_n(i_n) \cdot L(i_n)}{\frac{1}{N}\sum_{n=0}^{N} L(i_n)}, \quad Y_{av} = \frac{\frac{1}{N}\sum_{n=0}^{N} Y_n(i_n) \cdot L(i_n)}{\frac{1}{N}\sum_{n=0}^{N} L(i_n)}$$

where $L(i_n)$ is the luminance associated to the current amplitude $i_n$. $X_n(i_n)$, $Y_n(i_n)$ and $L(i_n)$ are used to describe the color points and the luminance as function of the current amplitude $i_n$. These values are measured for each OLED type. Assuming that the luminance is linearly correlated to the current these formulas simplify to $$X_{av} = \frac{\frac{1}{N}\sum_{n=0}^{N} X_n(i_n) \cdot i_n}{\frac{1}{N}\sum_{n=0}^{N} i_n}, \quad Y_{av} = \frac{\frac{1}{N}\sum_{n=0}^{N} Y_n(i_n) \cdot i_n}{\frac{1}{N}\sum_{n=0}^{N} i_n}$$

In case of a rectangular waveform described by three parameters, two amplitudes $I_1$ and $I_2$ and a duty cycle D, the formulas above simplify to a simple relation between the averaged color point and rectangular waveform parameters:

$$X_{av} = \frac{X(I_1) \cdot I_1 \cdot D + X(I_2) \cdot I_2 \cdot (1-D)}{I_1 \cdot D + X(I_2) \cdot I_2 \cdot (1-D)},$$

$$Y_{av} = \frac{Y(I_1) \cdot I_1 \cdot D + Y(I_2) \cdot I_2 \cdot (1-D)}{I_1 \cdot D + Y(I_2) \cdot I_2 \cdot (1-D)}$$

The averaged color points, as defined from multiple waveform shapes, can potentially vary across a large area in the CIE diagram.

In step 205 the info unit 103 selects the modulated waveforms for which the color distances which lie within the predefined area around the color point target. The area around the color point target may include, for example, a rectangle or a circle. In the case of the circle area around the target color point, the control unit compares every distance dist of the group of parameters with the circle radius and only selects the distances below that radius. The size of the area around the target color point depends on the lightning application being considered. However, it should be smaller 0.1, more preferably smaller 0.05 and most preferably smaller than the smallest discernible color difference the human eye can perceive which is equal to 0.00384 in the standard CIE diagram. For example, in the case of the rectangle area, the maximum diagonal length of the rectangle is equal to 0.00768 in the standard CIE diagram. In the case of a circle area, the minimum radius length is equal to 0.00384 in the standard CIE diagram. The smaller the acceptable distance to the color point target are the higher are the requirements regarding to the selection of the waveforms. High end application may require that the area around the target color point is that small that a difference to the color point target is not visible for the human eye.

In step 207, the info unit 103 selects one modulated waveform, to feed to the OLED, among the modulated waveforms having the distances lying within the target region. For example, the selected waveform comprises amongst said modulated waveforms the modulated waveform with the lowest current amplitude and/or or lowest root mean square amplitude. The group of parameters of the selected waveform is stored in the memory unit 119. The Control unit monitors the OLED current to assure that the current waveform has the selected modulated waveform.

In the last step 209, after being transferred to the driver unit 105, the driver unit 105 employs the selected group of parameters in order to provide the current with the selected modulated waveform to the OLED.

FIG. 3 shows a graph 300 of the current amplitude as function of time. The current amplitude varies according to a sinusoidal waveform shape. The waveform is sampled to N samples over its time period T 305. Each sample is associated with the current amplitude $i_n$ 303.

Figure 4:
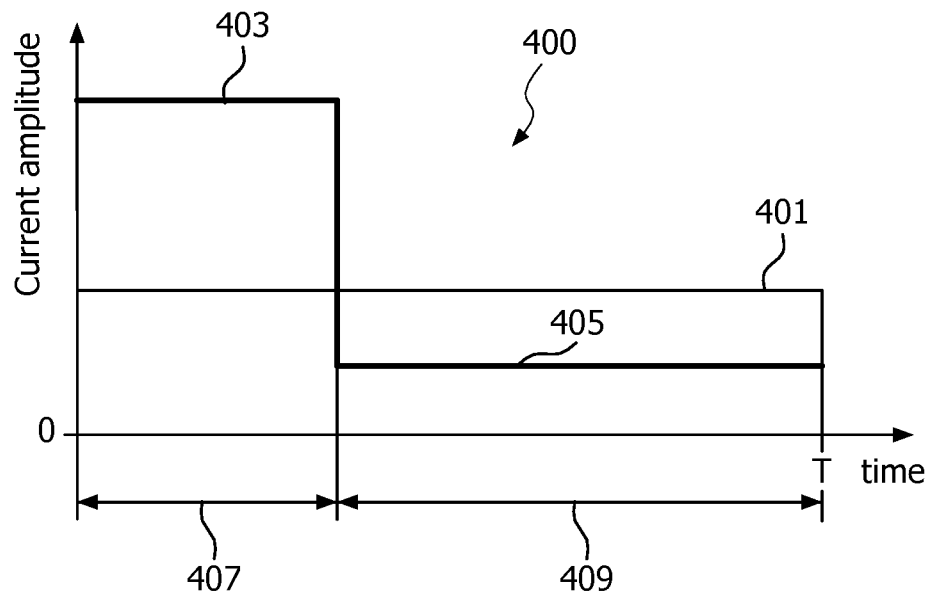
FIG. 4 shows a rectangular waveform.

FIG. 4 shows an example use case of an embodiment of the present invention. It is a graph of the current amplitude as a function of time. It shows a rectangular waveform 400 having a period T divided into two portions 407 and 409. During the first portion 407 the amplitude is set to $I_1$ 403. During the second portion 409 the amplitude is set to $I_2$ 405. The amplitude $I_2$ is lower than the amplitude $I_1$. A duty cycle D is associated to the waveform. The duty cycle refers to the portion of the signal 400 during which the signal amplitude is at higher level $I_1$ compared to the duration of the entire signal cycle. The duration of the first portion 407 is equal to D×T and the duration of the second portion 409 is equal to (1−D)×T. Thus, the amplitude average value $I_m$ 401 of the waveform over a period of time T is given by: $I_m = D \times I_1 + (1-D) \times I_2$.

Figure 5:
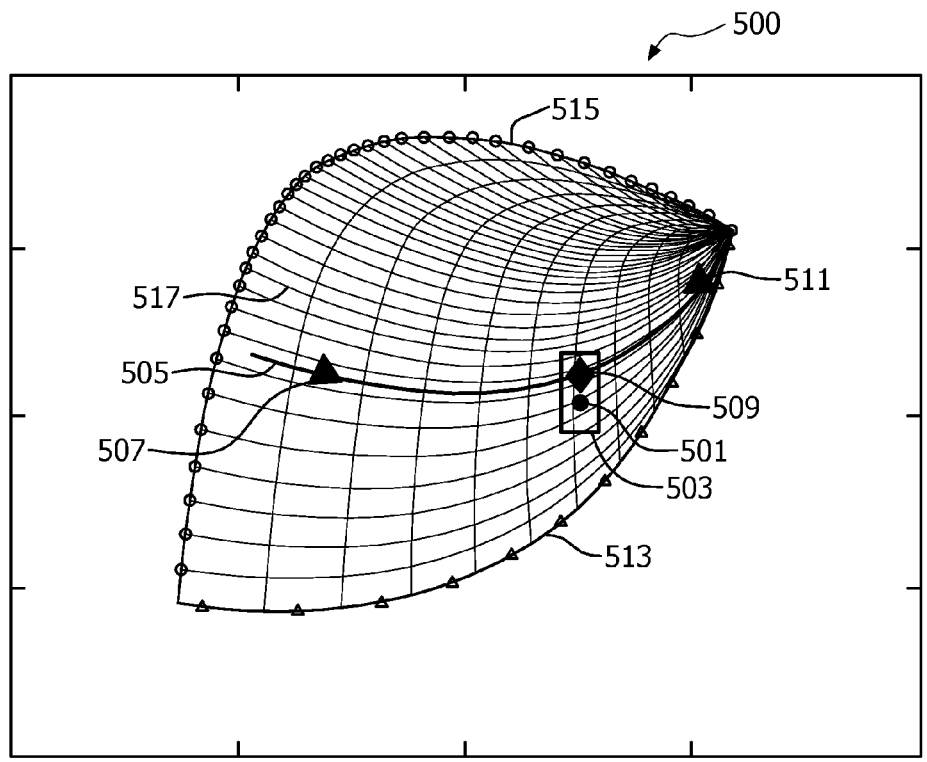
FIG. 5 shows a color shift area in CIE diagram for the rectangular waveform.

A user may wish to change the light output of the OLED 107 to provide a desired light output given as a color point target 501 in FIG. 5. The target color point 501 in this example is surrounded by a target area delimited by a rectangle 503. The brightness of the OLED, which is approximately proportional to the average current $I_m$, should correspond to a predefined value.

To reach the desired target color point while keeping the same averaged amplitude $I_m$ (i.e. the same brightness), the amplitude parameters $I_1$ and $I_2$ and the duty cycle D will be adjusted. This adjustment results in a set of groups of parameters $(I_1, I_2, D)_k$. Every group of parameters k will define a different shape for the rectangular waveform for which the resulting light output of the OLED has certain coordinates $(X_k, Y_k)$ in the CIE diagram.

For example, when $I_1$ is set to the value of 0.6 A, $I_2$ and D are varied such that the average amplitude $I_m$ is always the same. This leads, for example, to the following set of three groups of parameters:

$(I_1, I_2, D)_1 = (0.6 A, 0.131 A, 0.04)$, $(I_1, I_2, D)_2 = (0.6 A, 0.081 A, 0.133)$, $(I_1, I_2, D)_3 = (0.6 A, 0.018 A, 0.227)$. Each group of these parameters defines specific shapes of the waveform 601, 603 and 605 of FIG. 6 respectively. Feeding to the OLED the current waveforms 601, 603 and 605 will result in output lights having color point chromaticity coordinates 507, 509 and 511 respectively in the CIE diagram 500.

Increasing the number of group of parameters for that same value of $I_1=0.6$ A by further varying the amplitude $I_2$ and the duty cycle D will lead to a variation of the color points coordinates according to the trace 505 in the CIE diagram of FIG. 5.

Choosing other value of $I_1$, for example $I_1=1$ A and changing accordingly $I_2$ and D will lead to another trace 513 in the CIE diagram of FIG. 5. Multiple traces can be obtained by varying all the three parameters. These traces will define an area 517 in the CIE diagram of FIG. 5.

In the area 517 of color points, there is a color point 509 of the OLED 107 which belongs to the target area 503. This color point is defined from the waveform having the group of parameters $(I_1, I_2, D) = (0.6 A, 0.081 A, 0.133)$, which defines a waveform leading the OLED to emit a light with averaged color point coordinates 509.

FIG. 5 is a representation of the CIE color space diagram having an (x,y) chromaticity coordinates. It shows the color point shift area 517 of the rectangular waveform 400. The area is the result of multiple traces of color points obtained from the variation of the amplitude parameters, I1 and I2 and the duty cycle D of the rectangular waveform 400.

Figure 6:
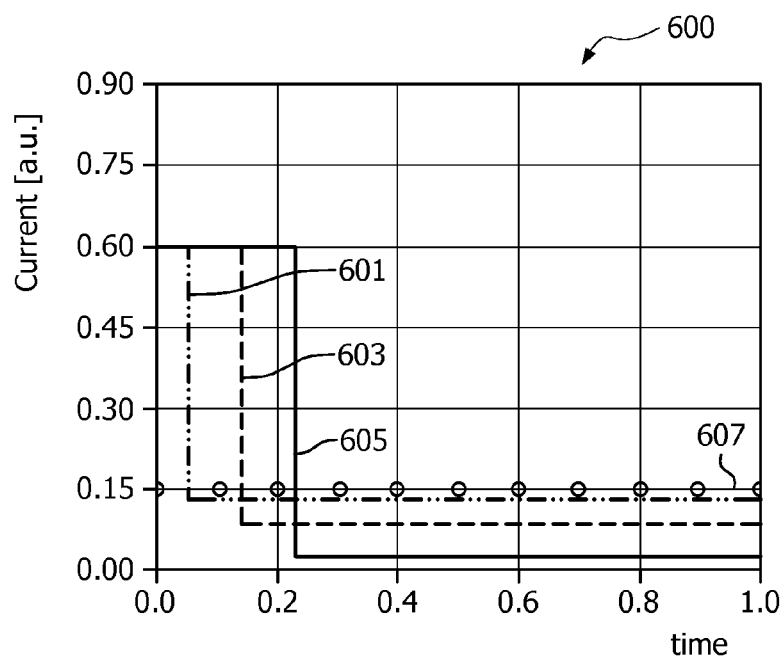
FIG. 6 shows three different shapes of a rectangular waveform.

FIG. 6 is a graph of the current amplitude as function of time. It shows three different rectangular waveform shapes 601, 602 and 603 having the same amplitude average 607.

LIST OF REFERENCE NUMERALS 100 system
101 driver system 103 info unit
104 adjusting unit
105 drive unit
107 OLED device
109 power source
111 emitted light
113 power signal
117 control unit
119 memory unit
300 periodic waveform
303 current amplitude
305 time period
400 rectangular waveform
401 average amplitude
403 current amplitude I1
405 current amplitude I2
407 time portion
409 time portion
500 CIE diagram
501 target color point
503 target area
505 trace
507-511 color point
513-515 trace
517 area in CIE diagram
600 rectangular waveform
601-605 rectangular waveform shape
607 average current amplitude

The invention claimed is:

1. A method for adjusting a color point of light emitted from an organic light emitting diode (OLED) by using current with a modulated waveform for driving the OLED, the waveform comprising at least three different parameters and the color point located in a color space, the method comprising:
defining a color point target;
adjusting the at least three parameters to tune the waveform by:
determining a set of groups of parameters, wherein each group of parameters of the set of groups of parameters is defining a specific shape of the modulated waveform;
selecting the group of parameters of the set of groups of parameters for which the resulting light output of the OLED is lying within a predefined area around the color point target and the brightness of the OLED remains at a predefined level;
for each group of the parameters defining the respective modulated waveform and calculating an averaged color point, wherein the calculation of the averaged color point comprises a summation over at least one period of the waveform of every color point associated to the current amplitude at each point in time of the modulated waveform, weighting the summation by a luminance associated to the current amplitude at each point in time of the modulated waveform, wherein the summation is performed such that the luminance is linearly correlated to the current;
for each averaged color point calculating a color distance to the target color point;
selecting the modulated waveforms for which the color distances are lying within a predefined distance from the target color point;
choosing one of the selected modulated waveforms; and
employing the chosen waveform to provide the current with the modulated waveform to the OLED.

2. The method according to claim 1, wherein the step of choosing one of the selected modulated waveforms comprises: choosing the modulated waveform of the selected modulated waveforms with the lowest current amplitude and/or the lowest root mean square amplitude.

3. The method according to claim 1, wherein the modulated waveform comprises a pulse width modulated waveform or a pulse frequency modulated waveform.

4. The method according to claim 1, wherein the area around the color point target is a rectangle, wherein a maximum diagonal length of the rectangle is smaller 0.1 in the standard CIE diagram.

5. The method according to claim 1, wherein the area around the color point target is a circle, wherein a maximum radius length of the circle is smaller 0.1 in the standard CIE diagram.

6. The method according to claim 1, wherein the modulated waveform comprises a periodic rectangular waveform characterized by two amplitude parameters and a duty cycle.

7. A computer-readable non-transitory storage medium comprising computer-readable instructions which, when executed by a processor, cause the processor to perform the method of claim 1.

8. An OLED driver system for adjusting a color point of light emitted from an organic light emitting diode (OLED) by using current with a modulated waveform for driving the OLED, wherein the waveform is characterized by at least three different parameters, and wherein the color point is located in a color space, the OLED driver system comprising:
an adjusting unit for defining a color point target, wherein the adjusting unit is further adapted for determining a set of groups of parameters, wherein each group of parameters of the set of groups of parameters is defining a specific shape of the modulated waveform; selecting the group of parameters of the set of groups of parameters for which the resulting light output of the OLED is lying within a predefined area around the color point target and the brightness of the OLED remains at a predefined level; for each group of the parameters defining the respective modulated waveform and calculating an averaged color point, wherein the calculation of the averaged color point comprises a summation over at least one period of the waveform of every color point associated to the current amplitude at each point in time of the modulated waveform, weighting the summation by a luminance associated to the current amplitude at each point in time of the modulated waveform, wherein the summation is performed such that the luminance is linearly correlated to the current;
for each averaged color point calculating a color distance to the target color point; selecting the modulated waveforms for which the color distances are lying within a predefined distance from the target color point; and choosing one of the selected modulated waveforms; and
a driver unit for employing the tuned waveform to provide the current with the modulated waveform to the OLED.

9. The OLED driver system of claim 8, wherein the driver unit comprises an integrated controller and/or a microcontroller circuit.

* * * * *